Patented Sept. 2, 1924.

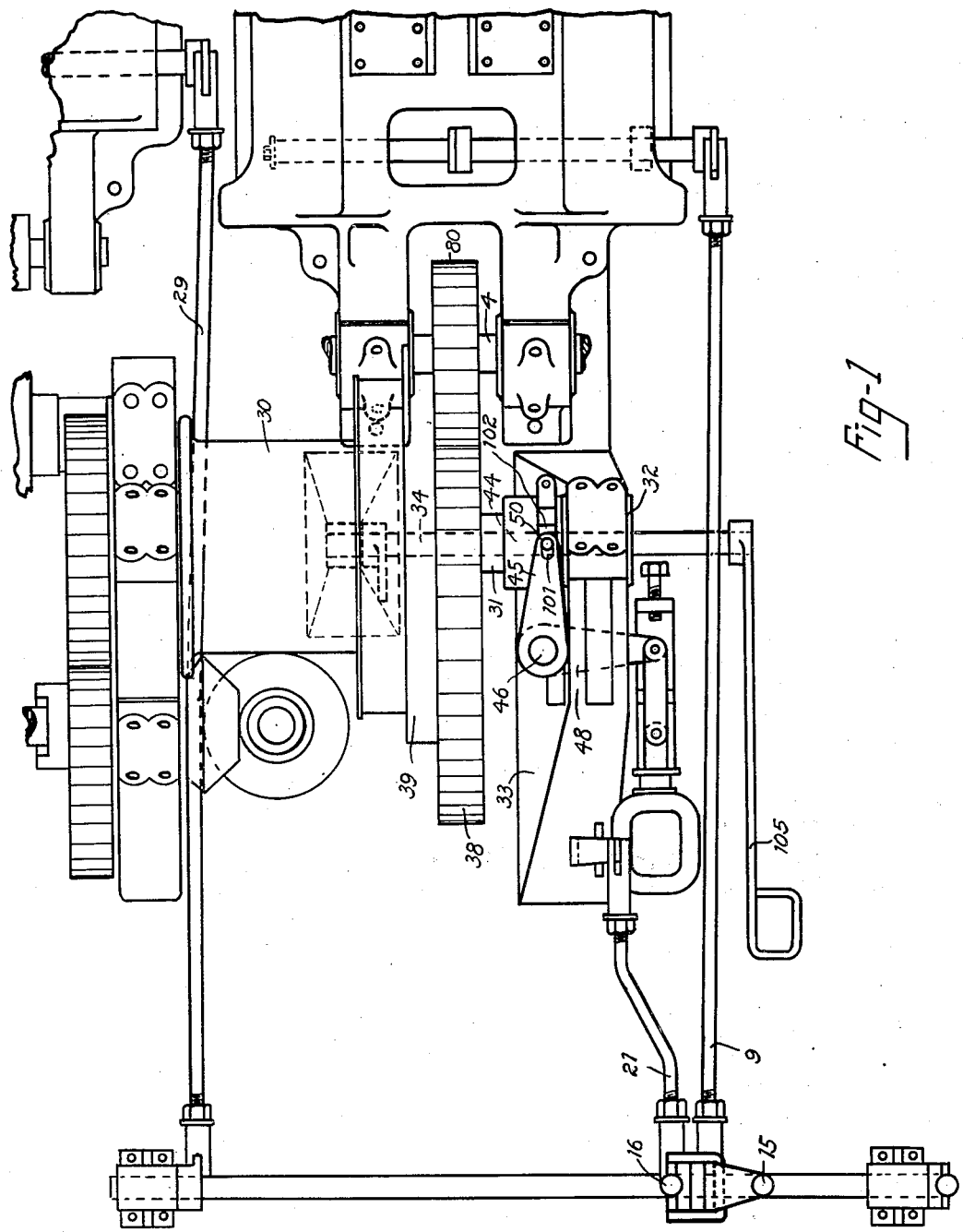

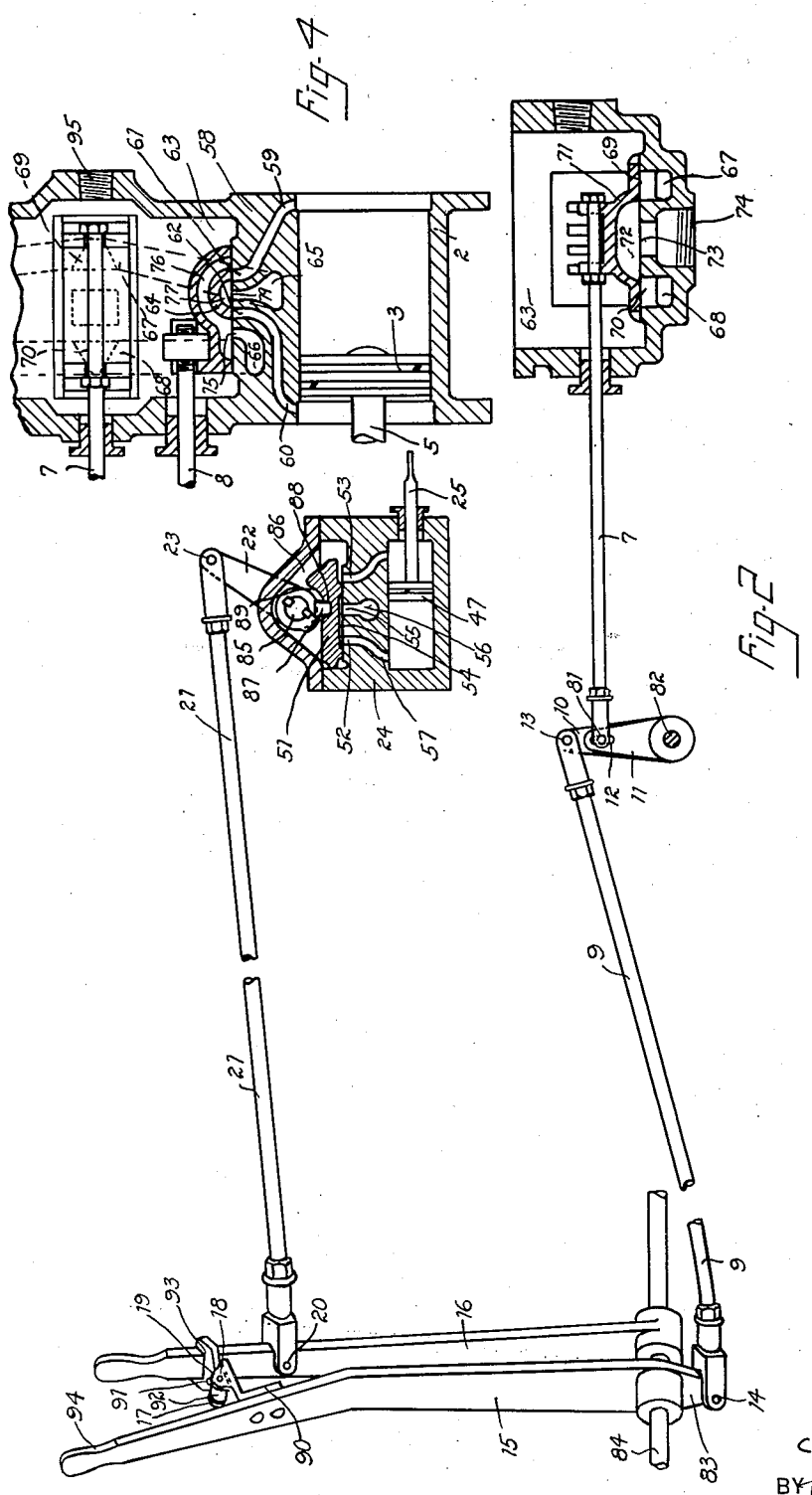

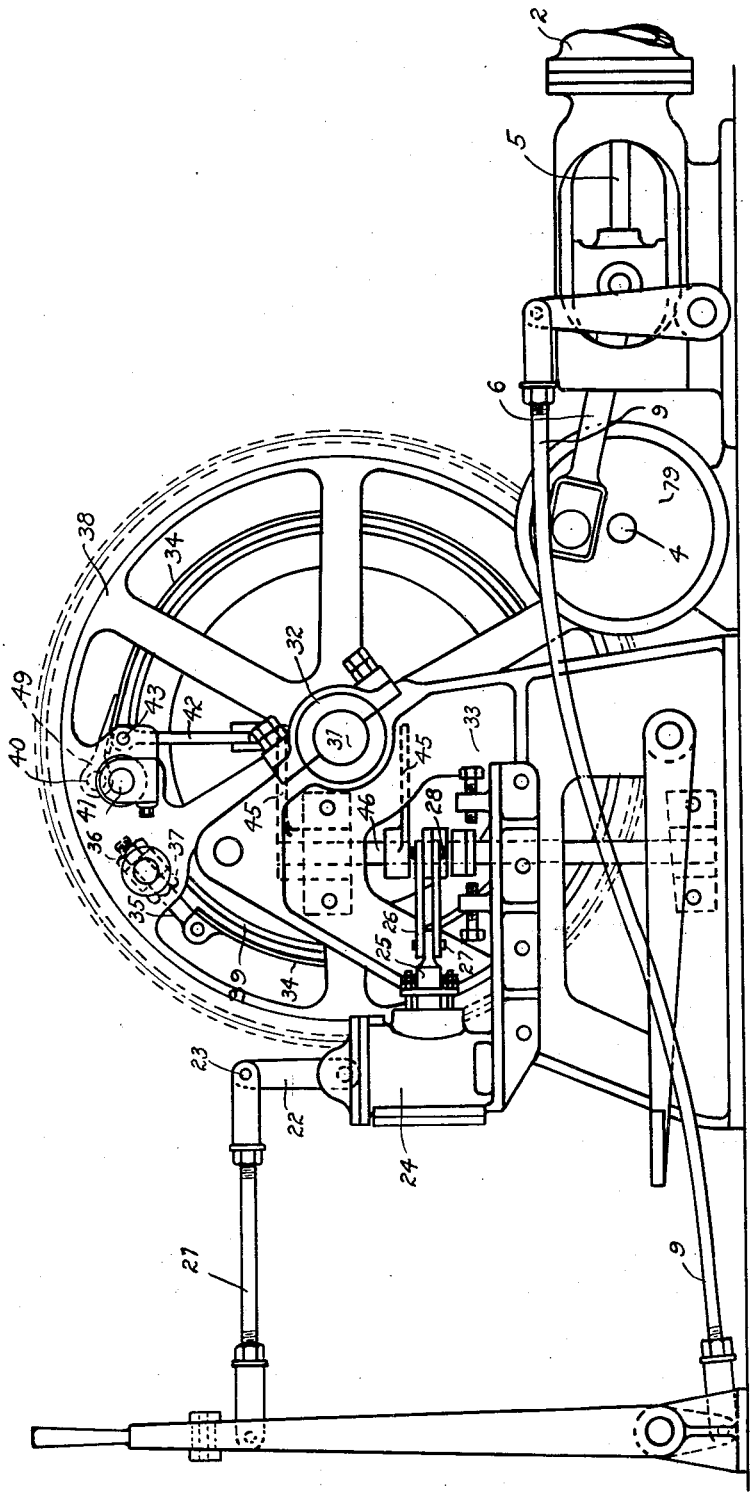

1,507,011

UNITED STATES PATENT OFFICE.

CHARLES A. WEBER, OF LORAIN, OHIO, ASSIGNOR TO THE THEW SHOVEL COMPANY, OF LORAIN, OHIO, A CORPORATION OF OHIO.

ENGINE AND CLUTCH CONTROLLING MECHANISM.

Application filed March 26, 1921. Serial No. 455,889.

*To all whom it may concern:*

Be it known that I, CHARLES A. WEBER, a citizen of the United States, residing at Lorain, in the county of Lorain and State of Ohio, have invented certain new and useful Improvements in Engine and Clutch Controlling Mechanisms, of which the following is a full, clear, concise, and exact description, such as will enable others skilled in the art to which it appertains to make and use the same.

This invention relates to engine and clutch controlling mechanisms, and consists in certain improvements in the construction thereof, as will be hereinafter fully described and pointed out in the claims.

With some engines used in combination with clutches, and in particular with steam shovel engines, or the like, it is desirable to simplify the controlling mechanism whereby the engine may be operated, shut down or reversed, and the clutch operated or released, with the minimum of effort on the part of the operator, requiring the manual operation only of as few parts as possible, and at the same time securing efficient operation of the controlled mechanisms. Particularly with hoisting engines and with the hoisting engines used in connection with steam shovel mechanisms the operator has so many controlling levers to handle that the simplification of any part of the controlling mechanism is of great importance.

It is an object of the present invention, therefore, to simplify the method of controlling the operation of the engine and of the clutch mechanism, whereby the operator may, by operating a minimum amount of manually operated apparatus, exercise a great degree of control over the controlled apparatus.

Another object of my invention consists in providing means whereby wear and tear on the mechanism employed and frequent disabling or breaking of such mechanism, as well as other desirable results may be avoided, by enabling the operator of the machine to lower the shovel or bucket more slowly and smoothly than would be accomplished were the bucket allowed to fall without being restrained in a suitable manner, such as herein disclosed.

Another object of my invention consists in the improvements in the apparatus operating under the control of the manually operated levers, and as will be later described.

Another object is to improve the linking mechanism whereby motion is communicated from a moving to a moved portion of the controlling mechanism.

Other objects of my invention and the invention itself will be more apparent by reference to the accompanying drawings, in which—

Fig. 1 shows a plan view of a portion of a steam shovel mechanism in which my invention is embodied, said view showing the controlling levers, a view of the intermediate controlling links and a clutch, said clutch being associated with the hoisting drum of a steam shovel.

Fig. 2 shows side views, parts being shown in cross-section, of the controlling levers, intermediate controlling links and sectional views through the engine steam chest and controlling valve chests employed in the embodiment of my invention illustrated.

Fig. 3 shows a side elevation of the apparatus illustrated in the other two figures.

Fig. 4 shows a sectional view of the engine cylinder block, and which block also contains the engine controlling valve mechanism.

Referring now to the various figures, in all of which like parts are indicated by like reference characters, at 2 is shown an engine cylinder, of which one or more may be provided, each having a piston 3, said piston being adapted to rotate a shaft 4 by means of a piston rod 5 attached to the piston and a reciprocating driver rod 6. The engine having the cylinder 2 is adapted to be operated by steam power and for the purpose of rotating the hoisting drum 30, said drum having secured thereto a friction wheel 39. The hoisting drum 30 is mounted on a shaft 31.

The shaft 31 is carried by bearings 32 in the frame 33. A friction clutch band 34 is adapted to be contracted to grip the hoisting drum friction wheel 39. The friction band is anchored by means of a bolt 35, said bolt passing through a pin 36 and being secured thereto on either side by nuts 37, said pin being mounted on the gear wheel 38. The friction band is adapted to be contracted by having its other end 49, which is carried on a pin 40, moved thereby in the direction of the bolt 35, securing the other end of the band.

The pins 40 and 43 are adapted to rotate about a center crank shaft journal 41, being disposed on different radii extending substantially at right angles one from the other, the center of rotation comprising the journal 41. Therefore, when it is desired for the clutch band to grip the clutch drum, the same is accomplished by longitudinally moving the clutch operating link member 42, which has an opening in its upper end, through which opening the pin 43 projects, the longitudinal movement of the member 42 in an upward direction, therefore, causing the pin 40 to be moved in a counter-clockwise direction about the center crank journal 41.

The clutch operating link 42 is caused to move the pin 43 up or down to operate the clutch, or to release it by the action of the steam ram having a casing shown at 24, a piston 47 and piston rod 25. The motion of the piston rod is communicated to a pair of link members 26 to which it is secured by a pin 27, the said link members being adapted to operate a crank shaft 46 having crank arms 45 and 48. Two crank arms 45 are provided, operating as one, the end of each containing an elongated perforation 101 adapted to embrace lugs 50 extending through the said perforation, the said lugs being carried on a collar 102, and which collar fits within a groove contained in a collar 44, said collar being longitudinally movable on the shaft 31 and having a connection with the clutch operating link 42. Thus, when the piston rod 25 is reciprocated, the link 42 will also be reciprocated to clutch or unclutch the brake bands 34. The action of the piston 47 is controlled by a controlling valve 51, operating over the ports 52 and 53, said valve being provided with a valve port 54 adapted to connect either the port 52 or 53 with an exhaust port 55, the exhaust port leading to the exhaust passage 56. Steam enters one or the other of the ports 52 or 53 as it is uncovered by the valve 51. As shown, the port 53 is open and steam entering the said port the engine piston 47 will be driven to the left, as seen in Fig. 2. With the valve in this position, steam is exhausting by way of the passage 57, the valve port 54, the exhaust port 55 and the exhaust passage 56.

It will be observed that by moving the valve 51 on its seat to the right, the port 53 will be covered by the port 54 and the port 52 will be uncovered, thus making a passage for exhaust steam between the port 53 and the exhaust port 55, and at the same time opening the port 52 for the ingress of steam to the cylinder at the left of the piston 47, said piston then being caused to move to the right. Thus, the clutch may be contracted or expanded to grip or release the clutch drum, as may be desired, depending upon the position of the valve 51 on its seat within the valve casing 24.

The action of the controlling valve for the steam engine having the cylinder 2 will now be described. The engine is provided with a cylinder 2, a piston 3 and piston rod 5, said cylinder being bored through a block 58, said block containing passages 59 and 60 from either end of the cylinder to ports 61 and 62. Steam from the boiler will enter the steam chest 63 by the passage 95 and be delivered via the valve passages 67 or 68 and the engine slide valve ports through the passages 59 and 60. By directing the steam through one or the other of the passages 67 or 68, the engine may be operated in either direction.

An engine valve 64 operates over the ports 61 and 62. The passages 65 and 66 communicate with the passages 67 and 68 leading to ports 69 and 70, which lead into the valve chest. The controlling valve 71 in the chest is so disposed on a seat that it may operate over the ports 69 and 70, the valve 71 being provided with a valve port 72 which is adapted to either unite the port 69 or the port 70 with the exhaust port 73 leading to the exhaust passage 74. Steam enters one or the other of the ports 69 or 70 as it is uncovered by the valve 71, the position of the valve 71 being determined by the operator moving the rod 7 attached to the said valve. When the engine is operating and the valve 71 is to the right, the port 70 will be uncovered and steam entering the port 70 will pass through the passage 68 to the passage 66 and then, as the engine valve controlling shaft 8 is by the motion of the engine moved towards the right through the port 75 and into the valve passage 76, whence it passes through the port 62 and the passage 60 into the cylinder at the left-hand side thereof, to cause the piston 3 to move, as shown in Fig. 4, to the right. When so operated, exhaust steam will pass from the cylinder into the passageway 59 and through the port 61 and the valve passageway 77 into the exhaust port 79, whence it will be delivered through the exhaust passageway 65.

The piston 3 will subsequently be driven in the opposite direction when the controlling rod 8 so moves the engine valve that the ports 75 and 61 will be connected through the passageway 76 for the entry of live steam into the right side of the cylinder piston 3, and when also the exhaust steam from the left end of the cylinder will pass through the passage 60, valve passageway 77 and exhaust port 78 into the exhaust passageway 65, the rod 8 being controlled by the movement of the piston rod 5. The action of an engine in a given direction is made continuous, the piston 3 reciprocating backwards and forwards under steam power. The valve 71, however, is operated manually to direct steam either through the port 67 or the port 68, depending upon the direction of rotation which it is intended to give the driven member 79 to which the driver 6 is connected.

As shown in Fig. 2, the valve 71 has a port 72, which is large enough to connect a small area of both the ports 69 and 70 to the exhaust passageway 73, at the same time when the said valve 71 is held substantially in its said non-engine operating position. In such a position steam under compression on either side of the engine cylinder will slowly be restored to normal pressure, due to the limited area of these positions of the ports 69 and 70 which are united through the valve passageway 72 to the exhaust passageway 74. This is done so that when the hoisting drum has been operated by the engine having the cylinder 2, and it is desired to slowly lower the load, the valve 71 is thrown to its mid position and the steam pressure in the cylinder 2, on either side of the piston 3, being slowly relieved will allow the piston 3 to be moved relatively slow under the power of the descending load, which is carried by a cable passed over an end of a steam shovel boom in a well known manner, the other end of the cable being passed around the drum 30, to which it is secured, and during the lowering of the load the weight thereof will cause the cable to be unwound from the drum 30, rotating the said drum and the connected gear 38, the motion being thereby transmitted to the engine driving gear 80 carried on the shaft 4, to which through the driving wheel 79, driver 6 and piston rod 5 the piston 3 is connected.

The rod 7 controlling the operation of the valve 71 carries at its other end a pin 81 disposed within a slot 12 carried on a crank arm 11, said crank arm 11 and crank arm 10 both being secured on a rotatable shaft 82. The crank arm 10 is pivotally secured at its end by a pin 13 to the rod 9 and which rod is pivotally connected at the point 14 to the downwardly projecting end 83 of the hand-lever 15, the hand lever 15 being loosely journalled on the shaft 84.

It will be obvious from Fig. 2 that when the operator wishes to move the valve 71 to the right or to the left or to its mid position, that this may be accomplished by throwing the upper end of the lever 15 forwards or rearwards, or restoring it to its mid position, as shown in the drawing. In like manner the valve 51 can be moved to the right or the left, by throwing the lever 16 forwardly or rearwardly, the motion being communicated by a rod 21 pivotally connected at one end to the lever 16 near its upper portion, and at the other end to a crank arm 22 keyed to a shaft 85 which extends into the steam chest 86 of the controlling valve mechanism. A short camming crank arm 87 is likewise secured to the shaft 85 and when the valve 51 is in the position shown in Fig. 2, fits within a depression or notch 88 in the upper surface of the valve 51, said notch preferably extending transversely of the said valve member.

When, however, the lever 16 has its upper end thrown forwardly to move the valve member 51 to the extreme right, the cam member 87 will eventually rise from the transverse notch 88 and pass over the surface 89 of the valve member 51, such surface 89 being curved, the center of curvature of the said surface being the axis of rotation of the shaft 85. Thus, the valve 51 will be moved upon a forward throw of the lever 16 very suddenly to the right, but any further movement of the lever 16 in the same direction will not operate the valve 51. Also, on the return movement of the lever 16, no movement of the valve 51 will take place until the lever 16 is nearly restored to the position shown in the drawing, when the rest of the movement of the said lever will be operative to move the valve 51 to its illustrated position, this being accomplished during that time when the cam member 87 is within the co-operating notch 88 in the valve member.

The two levers 15 and 16 are adapted to be releasably secured together by virtue of an L-shaped linking member 90 riveted to the lever 15 and having upstanding side ears 17 and 18, said side ears carrying a pin 19 supported between the ears. A forked member 93, having a portion 92 perforated, is carried on the said pin and is rotatably mounted thereon, the said forked member having a pair of forked prongs adapted to pass on either side of the lever 16 near its upper end, when the said forked member is rotated on the pin 19 to take the position shown in the drawing of Fig. 2. In this position the two levers 15 and 16 are securely linked together and will operate as a single lever and the operator may regard the two levers as a single lever having a single handle, such as 94, the operator being capable of operating all of the mechanism shown in Fig. 2 by means of the single lever 15, using its handle 94. However, should the operator prefer to operate the arrangement, as he may at times, by using individual levers 15 and 16 for operating the valves 71 and 51, individually, he may do so, by throwing the forked prongs of the forked member 93 upwardly, rotating the member 93 on the pin 19, the forked prongs then taking a position out of the way of the lever 16 and preferably a position where they will embrace the sides of the lever 15 to prevent the prongs becoming entangled in the clothing of the operator.

The relative positions of the manually operated controlling levers 15 and 16, the valve 51 and the valve 71, as illustrated in Fig. 2 is that position which these parts would have relative to each other in normal and inoperative condition. The lever 16 is not adapted to be moved rearwards, that is, to the right, as shown in Fig. 2, any further than the illustrated mid position, and therefore, when the levers 15 and 16 are linked together the lever 15 also cannot be moved further to the right, as shown, because of the restraint placed upon its movement by its connection with the lever 16.

The effect of moving the lever 15, when independently movable, by unlatching of the two levers, is to reverse the direction of rotation of the engine, as before mentioned, by uncovering the port 69, so that steam from the steam chest 63 may pass through the said port. It is seldom, if ever, desired in mechanisms of this type to run the engine in a reverse direction, except when the engine is mounted to propel a vehicle, and it is desired to propel the vehicle in a rearward direction, and at such a time, when this is desired, the two levers 15 and 16 will be uncoupled, so that the lever 15 may be independently manually operated by being thrown to the right, to so control the lever 71 as to produce a reversed rotation of the engine.

The link connections between the lever 15 and the valve 71 and the lever 16 and the valve 51 are so proportioned and the engaging surfaces of the top surface of the valve 51 and the valve controlling member 87 are so shaped that when the levers 15 and 16 are movable as a single lever, as they are when latched together, as illustrated in Fig. 2, that the first effect of their moving in a forward direction, that is, to the left, as illustrated in Fig. 2, will be that the valve 51 will be quickly moved to the right to uncover the port 52 and permit the passage of steam from the chest 86 through the said port and the steam passageway 57 leading therefrom, to the cylinder, the steam entering the cylinder on the left side of the piston, and the piston 47 will thereupon be propelled to the right, moving the piston rod 25 in such a direction as to operate the clutch bands to grip the clutch drum, so that when the clutch drum is rotated, the shovel or bucket will be elevated. Such rotation of the drum, however, may only be had by starting the engine comprising the piston 3, and I have so connected the lever 15 by links 7 and 8 to the valve 71 as to start the engine whenever the lever 15 is moved forwardly, that is, to the left, as shown in Fig. 2, to a sufficient degree, and therefore, upon a sufficient further movement of the lever, more than is necessary to operate the ram 24 to cause the clutch to be operated, the valve 71 will be moved to the right sufficiently to uncover the port 70, and the engine will thereupon be started, the drum thereupon rotated and the bucket or shovel elevated. Thus, I have provided means to first operate the clutch upon a forward movement of the single manually controlled element, that is, the handle 94 of the lever 15, to operate the clutch, to mechanically link the engine and the hoisting drum, and then only upon a further subsequent movement, which may be a continuing movement, cause the engine to be operated.

After the valve 51 has been moved to the right to a sufficient degree to accomplish the operation of the ram which operates the clutch, the valve 51 will not be further moved, although on the further continuing movement of the hand-operated lever, the controlling projecting cam 87 may cause the cam to be moved further, and this is accomplished, as before described, by causing the end of the cam to ride over the surface 87, which is so upwardly curved that when the valve is in its ram-operating position, that is, to its extreme right position, as viewed in Fig. 2, the curvature of the surface 89 will preferably have its center the center 85 of rotation of the said cam 87.

Now the operator having elevated the bucket, may desire to lower it under the power of its own weight and against the steam pressure contained in the engine cylinders, such steam pressure being slowly relieved, as before described. This may be accomplished in the system of my invention without unclutching the engine from the hoisting drum, the result being obtainable by the operator moving the handle 94 from its extreme forwardly operated position to an intermediate position, wherein the valve 71 is moved to such a mid-position wherein its port 72 is adapted to be substantially centrally located over the exhaust port 73, and will also communicate in a more or less limited way with both the ports 69 and 70. The weight of the shovel or bucket will then cause an unwinding of the hoisting cable from the hoisting drum, the drum being thereupon rotated in a reverse direction, and through the clutch members and interlinking gear members, the engine will be reversely actuated under the power exerted by the descending shovel or bucket, this motion being opposed by the steam pressure in the cylinders, said steam pressure being relieved by flowing through port 70. In this case no steam will flow through port 69, but air will flow through valve port 72 through port 69, passage 67, and will be exhausted through port 70 into valve port 72. In fact, when the engine is operated in a clockwise direction by the weight of the bucket, the first revolution of the engine would cause all steam to be exhausted from the cylinder 2 and air only would be admitted to cylinder 2 so long as valve 71 remains in the position shown in Fig. 2, in which position ports 69 and 70 should both be slightly open into valve port 72. As piston 3 moves to right from the position shown in Fig. 4, engine valve 64 moves at first to the left. The movement of piston 3 to the right produces a partial vacuum on left side of piston 3, which results in outside air being forced by atmospheric pressure through exhaust opening 74, through port 73 into valve port 72, through port 69 and passageways 67 and 65 into valve passage 77, through ports 62 and 60 into cylinder at left of piston 3. This flow of air continues until the piston 3 has reached the end of its travel to the right, when the valve 62 will again be in the position shown in Fig. 4. Thus, when the engine, as shown in Fig. 3, is running in a clockwise direction, the intake is through port 69 and exhaust is through port 70 into valve port 72, and the shovel or bucket is lowered by gravity without the use of steam. The exhaust passing through port 70 passes through the restricted connection between the said port and the port 72, which opens into the exhaust passage 74, through the exhaust port 73, as before described.

Now, if the operator desires to restore the apparatus to normal, this may be accomplished by pulling the handle 94 of the lever 15 back to normal upright mid-position, as illustrated in Fig. 2, whereupon the valve 51 will be moved to the position indicated in the drawing, and the ram will be operated by the power of steam flowing through the port 53 to unclutch the clutch bands, thus mechanically inter-linking the engine and hoisting drum. Such further final restoring movement of the handle 94 will move the valve 71 to the position indicated in the drawing, wherein it is moved to a position to the left of a central position with reference to the exhaust port 73, but is not moved sufficiently to the left to uncover the port 69 for the inflow of steam from the chest 63.

Of course, if the operator desires to merely unlatch the levers 15 and 16, he may independently operate them, as he may desire, it being an object of my invention to permit such independent movement of the levers as may be desired by the operator to accomplish useful functions, at the same time permitting latching of these levers, so as to operate as a single lever by a single manually operated handle, whenever the operator desires to so control the mechanism.

I also provide in connection with the clutch drum 30 a manually operated brake, adapted to clutch the drum 30 and the gear wheel 38, said brake being operable by the usual foot lever 105. This foot lever is well known in the art, as is also the brake controlled thereby, and will need no specific description.

Having thus described my invention, I wish it to be understood that numerous and extensive departures may be made from the embodiment herein illustrated and described, but without departing from the spirit of the invention.

What I claim is:

1. In combination, an engine, a clutch, a hoist drum, said clutch being adapted to link said engine and said drum, a steam ram, said ram controlling said clutch, an engine controlling valve, a ram controlling valve, separate mechanisms for operating each of said valves including operating levers, and means for coupling said levers together, each of said mechanisms being adapted to be operated by its lever when said levers are uncoupled and to be operated in unison by the actuation of one of said levers when said levers are coupled.

2. In combination, an engine, a clutch, a hoist drum, said clutch adapted to mechanically link said engine and said drum, a steam ram, said ram controlling said clutch, an engine controlling valve, a ram controlling valve, a single manually operated means controlling both said valves, a motion communicating link between said means and said engine controlling valve, and a second motion communicating link between said lever and said ram controlling valve, said second valve being alone moved to operating position upon a preliminary movement of said means, said first valve being operative upon a subsequent further movement of said means.

3. In combination, an engine, a clutch, a hoist drum, said clutch adapted to mechanically link said engine and said drum, a steam ram, said ram controlling said clutch, an engine controlling valve, a ram controlling valve, a single manually operated means controlling both said valves, a motion communicating link between said means and said engine controlling valve, and a second motion communicating link between said lever and said ram controlling valve, said second valve being alone moved to operating position upon a preliminary movement of said means, said first valve being operative upon a subsequent further movement of said means, said valves being adapted to be moved by said links under the control of the said single means one after the other as said means is being fully operated.

4. In an engine and clutch control mechanism, an engine, a hoist drum, a clutch, said drum being adapted to be mechanically linked to said engine, an engine controlling and reversing valve, a clutch operating steam ram, a movable element therefor, a second valve controlling the motion of the ram movable element, separate mechanisms for controlling each valve including a lever, and means for coupling said levers together, the operation of one of said levers when said levers are coupled together operating said first valve upon a certain predetermined movement, and said second valve being operated upon a lesser movement thereof.

5. In an engine and clutch control mechanism, an engine, a hoist drum, a clutch, said drum being adapted to be mechanically linked to said engine, an engine controlling and reversing valve, a clutch operating steam ram, a movable element therefor, a second valve controlling the motion of the ram movable element, and a pair of levers detachably coupled together for controlling both said valves, said first valve being operated upon a certain predetermined movement of said levers, said second valve being first alone operative upon a lesser movement of said levers, said first valve having a non-engine operating position intermediate two operating positions in which position steam pressure on both sides said piston may be slowly relieved, one of said levers being adapted to move said first valve to such position, said second valve being held in clutch operating ram controlling position while said first valve is maintained in such engine steam relieving position.

6. In an engine and clutch control mechanism, the combination with an engine cylinder, a piston and a controlling valve therefor, driving and driven clutch members, a steam operated movable element for uniting said driving and driven members, a second controlling valve for the said steam operated element, and two controlling manually operative means releasably secured together for causing the operation in sequence of said element and said engine valve, whereby said clutch members are first united and then said engine is started.

7. In an engine and clutch control mechanism, the combination with a steam engine, a hoist drum, a clutch, said clutch being adapted to mechanically link said drum and said engine, a steam ram, a controlling valve for controlling the admission of steam to the said ram, said ram being adapted to operate the said clutch, a second valve, said second valve being adapted to control the admission and exhaust of steam from the said engine, whereby said engine may be started or stopped under the control of the said second valve, and two manually operated means linked together for causing the operation in sequence of both said valves when one of said manual means is operated, said second valve being adapted to start the said engine after said clutch has been operated under the control of said first valve.

8. In an engine and clutch control mechanism, the combination with a steam engine, a hoist drum, a clutch, said clutch being adapted to mechanically link said drum and said engine, a steam ram, a controlling valve for controlling the admission of steam to the said ram, said ram being adapted to operate the said clutch, a second valve, said second valve being adapted to control the admission and exhaust of steam from the said engine, whereby said engine may be started or stopped under the control of the said second valve, manually operated means for causing the operation in sequence of both said valves when one of said manual means is operated, said second valve being adapted to start the said engine after said clutch has been operated under the control of said first valve, means in said second valve operative upon a given valve position to slowly relieve the compression in the engine cylinder, and links between said manually operated means and said valves whereby a given position of said means will cause said second valve to take the said steam relieving position and said first valve will be maintained in clutch operating position.

9. In an engine and clutch control mechanism, the combination with a steam engine, a hoist drum, a clutch, said clutch being adapted to mechanically link said drum and said engine, a steam ram, a controlling valve for controlling the admission of steam to the said ram, said ram being adapted to operate the said clutch, a second valve, said second valve being adapted to control the admission and exhaust of steam from the said engine, whereby said engine may be started or stopped under the control of the said second valve, manually operated means for causing the operation in sequence of both said valves, said second valve being adapted to start the said engine after said clutch has been operated under the control of said first valve, means in said second valve operative upon a given valve position to slowly relieve the compression in the engine cylinder, and links between said manually operated means and both said valves whereby a given position of said means will cause said second valve to take the said steam relieving position and said first valve will be maintained in clutch operating position, one of said links being operative to move said first valve to clutch releasing position when said manually operative means is restored to normal position, another of said links being inoperative to re-start said engine when said first valve is in clutch releasing position.

10. In an engine and clutch control mechanism, the combination with an engine cylinder, a valve controlling the admission of steam to said cylinder, a second cylinder, a piston for the said second cylinder, a clutch, said piston when moved adapted to operate said clutch, a controlling valve for the said second cylinder, a cam for moving the said controlling valve, a recess in the said valve, said cam fitting within the said recess, a lever for moving the said cam to move the valve longitudinally to control the admission of steam into the said second cylinder on either side of the said piston as desired, said cam being shifted out of the said recess upon a predetermined lever movement, whereby further movements of the lever in the same direction will be inoperative to further advance the said valve.

11. In a valve, a plurality of ports, a slidable valve member for controlling the admission and exhaust of steam through the said ports, a notch in the said valve member, an end of the said lever extending within the said notch whereby said lever end may cam the said valve in either direction, said lever end being adapted to move out of the said notch upon a predetermined lever movement in one direction, whereby said lever is only operative to move the said valve over the said ports a predetermined distance in a given direction, said lever upon further movement in this direction producing no operative effect upon the valve, said lever re-entering the said notch upon a returned movement of its end to cam the said valve in the opposite direction.

In witness whereof, I have hereunto signed my name this 18th day of March, 1921.

CHARLES A. WEBER.